May 20, 1941. A. E. MARGOLIS 2,242,651

DISTRICT HEATING PLANT

Filed July 8, 1939

Patented May 20, 1941

2,242,651

UNITED STATES PATENT OFFICE 2,242,651

DISTRICT HEATING PLANT

Abraham Elia Margolis, London, England

Application July 8, 1939, Serial No. 283,361
In Great Britain July 11, 1938

8 Claims. (Cl. 237—19)

This invention relates to district heating plants and is concerned more particularly with the hot water distribution systems thereof.

Hitherto hot water distribution systems of district heating plants have consisted of two pipes, the flow and the return pipe, carrying the same amount of water. The water has been heated in the central station and carried through the flow pipes to the buildings and after transmitting the heat by means of radiators, pipe coils, calorifiers for heating or domestic hot water supply, or other heating apparatus, has been returned through the return pipes to the station to be heated and circulated again. The water has been the heat carrier only, and its quantity remaining the same, the flow and the return pipes of the distribution system have had to be determined for the full amount of water.

For domestic hot water supply individual plants in each building have been used, with cold water supply from the building and heat supply from the district heating plant.

Further, the return temperature of the water has been comparatively high, thus decreasing the temperature drop and increasing the volume of circulating water, and consequently increasing the sizes of the pipes of the distribution system.

An increase of the temperature drop and decrease of the pipe sizes has been possible with the superheated hot water system. This increase, however, has been obtained by raising the flow temperature, and the return temperature has been even higher than in the usual hot water distribution system. Furthermore the return pipes of a superheated hot water system have also to carry the same amount of water as the flow pipes.

In the case of a combined power and heating plant the comparatively high return temperature has also resulted in a high back pressure, thus reducing the power generation.

Due to these disadvantages the initial costs of the heat distribution system have been very high and the income derived from power generation has been affected.

The object of the present invention is to avoid these difficulties and to simplify the heat distribution by combining heat supply with domestic hot water supply into one system.

The invention therefore comprises a distribution system with hot water for domestic supply as a heat carrier for space heating or other purposes, the water being heated to a correspondingly higher temperature, and calorifiers in the buildings in which the return water of the individual heating systems is heated to the desired temperature and the primary water is cooled to be used for domestic purposes. The distribution system consists either of flow pipes without return pipes or of flow pipes with return pipes in which only the surplus of hot water, above the requirements of the domestic hot water supply, is carried back to the station, whence, after being reheated and mixed with an additional supply of hot water, it is again carried to the buildings.

The different requirements of heating and domestic hot water supply can be balanced by several methods. As a rule, the flow temperature of the heat carrier, in this case the water for domestic hot water supply, will be chosen in accordance with the season and the weather conditions. In the summer, when there is no demand for heat for space heating the lowest permissible temperature is chosen, for instance, 130 or 140° F which is just sufficient to meet the requirements for domestic hot water supply; in the autumn and spring, a flow temperature of perhaps 180–250° F. is chosen and in the winter a correspondingly high temperature. The rise of temperature depends naturally upon the ratio of the heat demand for space heating to the heat demand for domestic hot water supply. When this ratio is low (low heat demand for space heating and high demand for domestic hot water supply) a lower flow temperature can be chosen and the distribution system can be arranged as a one-pipe system. When this ratio is comparatively high and the flow temperature cannot be increased, a two pipe system can be arranged, with return pipes of small size for the surplus of heating water above the demand for domestic hot water supply.

The return pipes can, however, be avoided if the buildings are provided with additional electric heating, either for raising the water temperature of the heating systems or for room heating by local heaters.

This method can be economically applied because the basic demand for heat is supplied by the hot water systems and the electric heating is required to cover only the deficiency of heat. To obtain good heating at an even temperature and to prevent waste of electricity, the electric heating apparatus can be provided with automatic temperature control.

The return pipes can also be avoided when it is possible to drain the surplus of heating water (above the demand for hot water supply), for instance, when the costs of the discharged water and of the heat losses are comparatively low. The heat losses are negligible when the heating system is arranged in two or more temperature stages and the surplus of water is cooled down to a low temperature, for instance about 90–110° F.

The fluctuation of the loads for space heating and domestic hot water supply during the day can be balanced by hot water storage in the buildings either for heating or domestic hot water or for both purposes.

When the domestic hot water is in some buildings not sufficiently cooled by the heating water, for instance, when the demand for domestic hot water is comparatively high, it can be cooled to the desired temperature by mixing with an appropriate amount of cold water.

The special advantage of this novel distribution system is the increase effected in the temperature drop by lowering the first temperature of the water. When the water is heated, for instance, from 60 up to 280° F. the available temperature drop for the calculation of the piping is 220° F. with a heat delivery of 220 B. t. u. per lb. of water. In consequence, the pipe sizes are very small and the first costs of the distribution system and the radiation losses, especially when the system can be carried out without return pipes, are very low.

The low first temperature of the water is also of great importance in the case of a combined power generation and district heating plant. The water can then be heated in two or several stages, for instance, from 60 to 90° F. by a normal condensing turbine, from 90 to 130° F. by back pressure steam of 3 lbs. per sq. in. abs., from 130 to 180° F. by back pressure steam of 10 lbs. per sq. in. abs., from 180 to 240° F. by back pressure steam of 30 lbs. per. sq. in. abs. and so on, according to the requirements. By heating the water in several pressure stages and by its low first temperature the maximum electric output is ensured. The high flow temperature on cold days decreases the power output but this is of minor importance because the number of cold days is comparatively small. The back pressure steam can be obtained either from special back pressure sets or, as bled steam, from a condensing or a combined back pressure turbine.

The heating water has to be treated to meet the requirements of domestic hot water supply and, furthermore, to protect the piping from corrosion, sludge and scale. With the development of high pressure steam technique in recent years, boiler feed water treatment has been thoroughly investigated and improved to a very high standard. The treatment of the heating water can nowadays, therefore, be reliably performed to meet all requirements. In special cases an additional thermal treatment can be introduced by an internal cycle of water cooling and reheating at the station. When there is a danger of scale formation in the piping, for instance, in the cooling range between 160 and 140° F. (during the night) this cooling process is performed at the station in a calorifier which can be cleaned at certain intervals. For this cooling, heating water of a lower temperature is used and the cooled water is reheated by back pressure steam, and the whole process is carried out without loss of heat.

The invention will now be more particularly described, by way of example, with reference to the accompanying drawing, showing diagrams of the heat supply.

Figure 1:
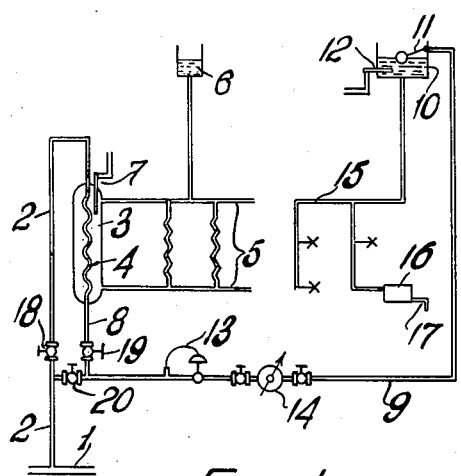
Fig. 1 represents a one pipe system for a small house.

In Figure 1 the heat supply of a small house from a one-pipe system is shown. From the street main 1 the hot water is supplied by connection 2 to the storage calorifier 3 with a heating coil 4 for warming the heating water. The calorifier 3 feeds the hot water system 5 which has an expansion tank 6. The hot water temperature in the storage calorifier can be raised by an electric heater 7. The hot water cooled by the coil 4 to the desired temperature is supplied for domestic use by the pipe 8 and 9 to the storage tank 10 with a ball valve 11. To raise the domestic hot water temperature an additional electric heater 12 can be provided.

The temperature of the domestic hot water is regulated by throttling down the amount of water passing through the coil 4 either by hand valve or by a temperature control device 13. The consumption is metered either by a heat meter or by a hot water meter 14.

From the tank 10 the domestic hot water is supplied to the distribution system 15, serving the taps. To this system an additional radiator 16 with a drain pipe 17 can be connected. This radiator is turned on, if required, on cold days to increase the volume of water passing the coil of the calorifier and its heating effect.

In the summer the heating system is cut off by the valves 18 and 19 and the domestic hot water is supplied by opening valve 20.

Figure 2:
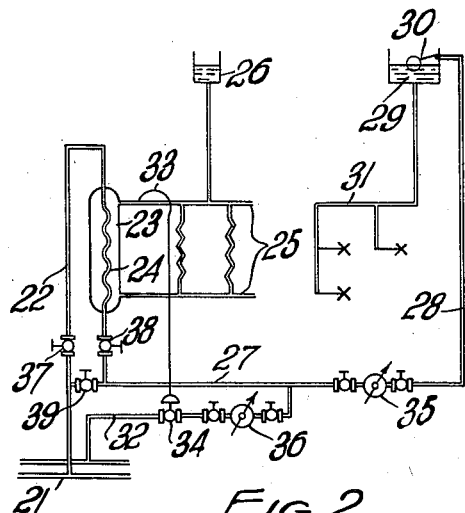
Fig. 2 represents the present invention applied to a two pipe system.

In Figure 2 connections similar to those of Figure 1 are shown, but with a two pipe system. From the street flow main 21 the hot water is supplied by connection 22 to the storage calorifier 23 with a coil 24. The calorifier 23 feeds the heating system 25 with an expansion tank 26. The hot water cooled by the coil 24 is supplied for domestic use by the pipes 27 and 28 to the storage tank 29 with a ball valve 30. From the storage tank 29 the hot water is supplied to the distribution system 31.

The temperature of the domestic hot water is regulated by throttling down the amount of water passing through the coil 24 either by hand valve or by a temperature control device.

When the hot water demand for heating is higher than for domestic supply the surplus of water is delivered by the return main 32 to the station. The amount of the required surplus is regulated either by hand valve or by a temperature control device with thermostat 33 and regulating valve 34.

The consumption is metered by the meters 35 and 36.

In the summer the heating system is cut off by the valves 37 and 38 and the domestic hot water is supplied by opening the valve 39.

Figure 3:
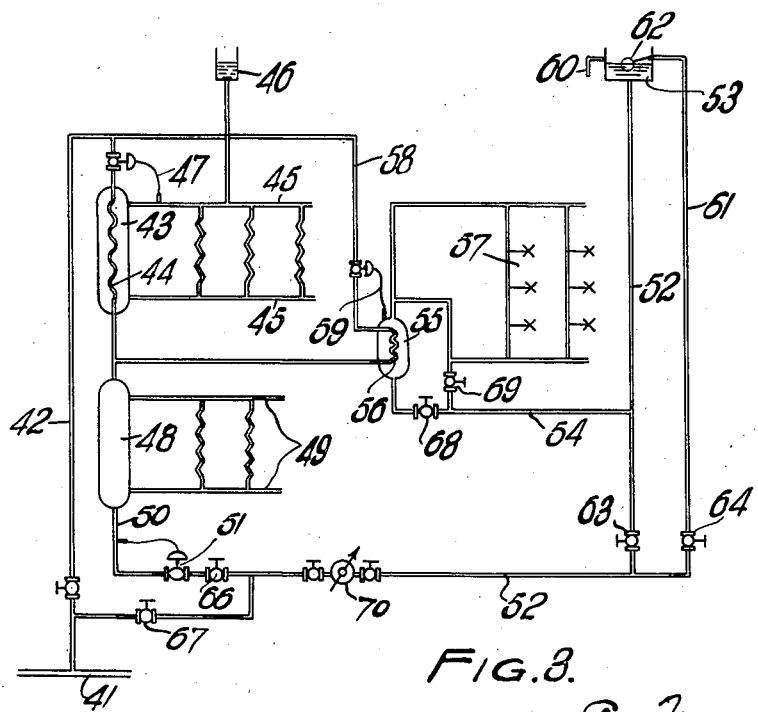
Fig. 3 represents modification of a one pipe system.

In Figure 3 the heat supply of a building with two heating systems from a one-pipe system is shown. From the street main 41 the hot water is supplied by connection 42 to the storage calorifier 43 with a heating coil 44. The calorifier 43 feeds the main hot water system 45 which has an expansion tank 46. The temperature of the hot water heating system is automatically regulated at the desired temperature by a temperature control device 47.

The primary hot water after being cooled by coil 44, is supplied to the storage tank 48 from which the secondary heating system 49 is fed. In this heating system the water is cooled down to a low temperature, for instance, 85–100° F. according to the weather conditions. The desired temperature is kept at a constant level by a thermostatic device with thermostat 50 and regulating valve 51. This water is supplied by the pipe 52 to the storage tank 53 and by the connection 54 to the storage calorifier 55 with coil 56. From this calorifier the domestic hot water heated to the desired temperature is supplied to the distribution system 57. The heating water is supplied to the calorifier by connection 58 and the temperature is controlled by a thermostatic device 59. The surplus of low temperature water is discharged from the storage tank 53 by drain pipe 60.

In the summer the storage tank 53 is supplied from connection 61 having a ball valve 62 and accordingly valve 63 is closed and valve 64 opened. The heating systems are cut off by the valve 65 and 66 and the valve 67 of the by-pass is opened. The calorifier 55 is cut off by valve 68, and the valve 69 in the by-pass is opened.

The heat consumption is metered by meter 70.

What I claim and desire to secure by Letters Patent is:

1. A system for supplying hot water for heating systems and for domestic use throughout a district embodying therein a hot water main from a source, a calorifier, a domestic hot water distributing system, a branch pipe from said main through said calorifier and connected with said distributing system, a hot water heating system, and means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main.

2. A system for supplying hot water for heating systems and for domestic use throughout a district embodying therein a hot water main from a source, a calorifier having sufficient capacity to permit storage of water for circulation in a heating system, a domestic hot water distributing system, a branch pipe from said main through said calorifier and connected with said distributing system, a hot water heating system, and means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main.

3. A system for supplying hot water for heating systems and for domestic use throughout a district embodying therein a hot water main from a source, a calorifier, a domestic hot water distributing system including therein a storage tank, a branch pipe from said main through said calorifier and discharging into said storage tank, a hot water heating system, and means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main.

4. A system for supplying hot water for heating systems and for domestic use throughout a district embodying therein a hot water main from a source, a calorifier, a domestic hot water distributing system, a branch pipe from said main through said calorifier and connected with said distributing system, a hot water heating system, means supplying water from said calorifier and independently of said branch pipe for circulation in said heating system, whereby there is a transfer of heat from the water flowing through said branch pipe to the circulating water in said heating system, and water for domestic use is brought to the temperature lower than the temperature of the water in said main, and means whereby a continuing circulation of hot water from said main through said calorifier may be maintained.

5. A system for supplying hot water for heating systems and for domestic use throughout a district embodying therein a hot water main from a source, a calorifier, a domestic hot water distributing system, a branch pipe from said main through said calorifier and connected with said distributing system, a hot water heating system, means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main, and an electrical heater associated with said calorifier, whereby the temperature of the water circulating in said heating system may be varied independently of the transfer of heat from the water flowing to said domestic hot water system to the water for circulation in said heating system.

6. A system for supplying hot water for heating systems and for domestic use throughout a district embodying therein a hot water main from a source, a calorifier, a domestic hot water distributing system, a branch pipe from said main through said calorifier and connected with said distributing system, valves in said branch pipe between said main and said calorifier, and between said calorifier and said domestic hot water distributing system, a by-pass having a valve therein between both of said valves and the point of connection of said branch pipe with said main, whereby hot water may be delivered directly from said main to said domestic hot water distributing system, a hot water heating system, and means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main.

7. A system for supplying hot water for heating systems and for domestic use throughout a district embodying therein a hot water main from a source, a calorifier, a domestic hot water distributing system, a branch pipe from said main through said calorifier and connected with said distributing system, a hot water heating system, means supplying water from said calorifier and independently of said branch pipe for circulation in said heating system, whereby there is a transfer of heat from the water flowing through said branch pipe to the circulating water in said heating system, and water for domestic use is brought to a temperature lower than the temperature of the water in said main, means controlling the flow of water through said branch pipe to said domestic hot water distributing system, and means whereby water passing through said branch pipe in excess of that required by said distributing system is returned to the source, said last named means consisting of a return main and a pipe leading from said branch pipe to said return main, and having therein a valve for regulating the flow of water from said branch pipe to said return main.

8. A system for supplying hot water for heating systems and for domestic use throughout a district embodying therein a hot water main from a source, a plurality of hot water heating systems each having associated therewith a calorifier, a domestic hot water distributing system, a branch pipe from said main passing through said calorifiers successively and connected with said distributing system, means supplying water from said calorifiers respectively and independently of said branch pipe, for circulation in the hot water heating system associated with that calorifier, an additional calorifier, pipe connections between same and said branch pipe upon opposite sides of the calorifier in one of said hot water heating systems, a valve in said branch pipe leading to said distributing system, and a valve controlled bypass from said branch pipe to said last named calorifier, whereby hot water may be supplied said distributing system directly from said branch pipe or from said branch pipe through said last named calorifier.

ABRAHAM ELIA MARGOLIS.